US006940021B2

(12) United States Patent
Pohl et al.

(10) Patent No.: US 6,940,021 B2

(45) Date of Patent: Sep. 6, 2005

(54) ZERO SPACE COMPONENT ADAPTER FOR RAIL MOUNTED TERMINAL BLOCK RELAYS

(75) Inventors: Randy Pohl, Mukwonago, WI (US); Elmar Gillrath, Huntington Beach, CA (US); Darrell S. Filtz, Cedarburg, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 27 days.

(21) Appl. No.: 10/688,313

(22) Filed: Oct. 17, 2003

(65) Prior Publication Data

US 2004/0087215 A1 May 6, 2004

Related U.S. Application Data

(63) Continuation-in-part of application No. 10/261,278, filed on Sep. 30, 2002, now Pat. No. 6,648,692.

(51) Int. Cl.[7] .................................................. H02B 1/00

(52) U.S. Cl. ................... 174/137 R; 439/638; 439/622; 361/626; 361/668

(58) Field of Search ...................... 174/137 R; 439/638, 439/622; 361/626, 668

(56) References Cited

U.S. PATENT DOCUMENTS

| | | | | | |
|---|---|---|---|---|---|
| 4,830,631 | A | * | 5/1989 | Hsueh | 439/622 |
| 4,968,269 | A | | 11/1990 | Urani et al. | |
| 5,093,985 | A | * | 3/1992 | Houldsworth et al. | 29/830 |
| 5,515,023 | A | | 5/1996 | Marach et al. | |
| 5,616,054 | A | | 4/1997 | Quinlan | |
| 6,563,697 | B1 | * | 5/2003 | Simbeck et al. | 361/668 |
| 6,650,222 | B2 | * | 11/2003 | Darr et al. | 337/187 |
| 2001/0043137 | A1 | * | 11/2001 | Endo et al. | 337/159 |

* cited by examiner

*Primary Examiner*—Chau N. Nguyen
*Assistant Examiner*—Jinhee Lee
(74) *Attorney, Agent, or Firm*—Quarles & Brady LLP; Alexander M. Gerasimow

(57) ABSTRACT

An in-plane fuse adapter provides a thin housing that may be received by a standard terminal block to present side surfaces conforming substantially to the width of the terminal block relay allowing other terminal blocks to be closely abutted to the left and right side of the terminal block relay when it is attached to a connector rail.

33 Claims, 4 Drawing Sheets

FIG. 3
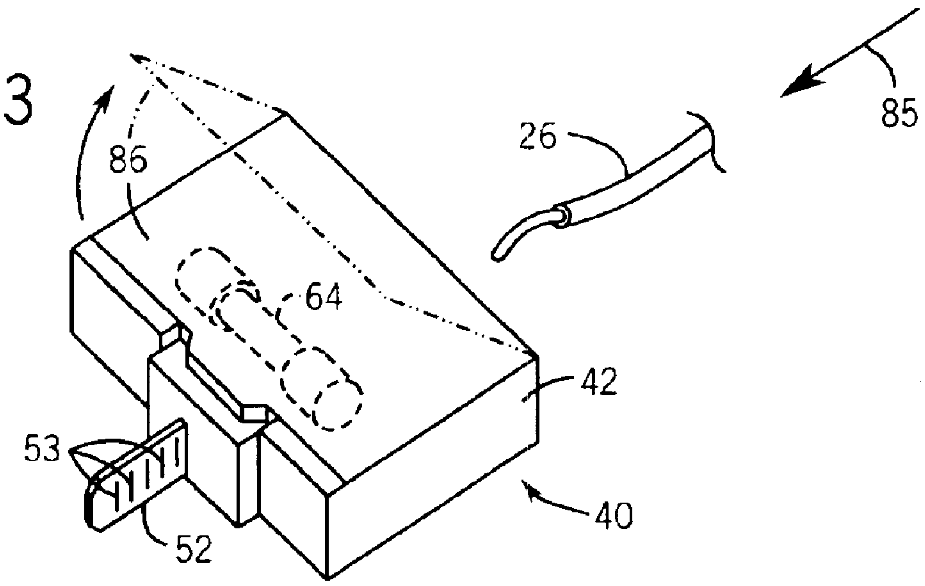
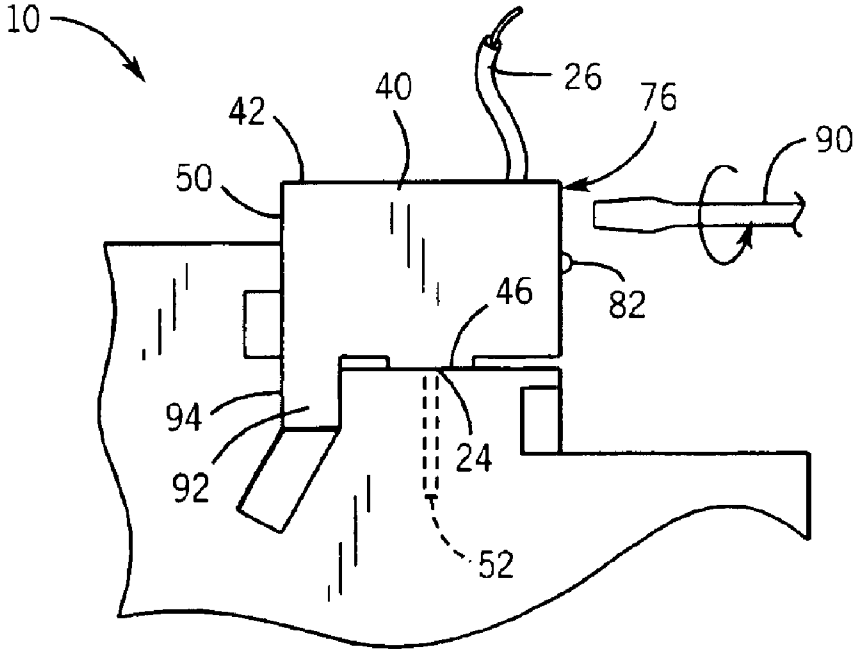
FIG. 4

ZERO SPACE COMPONENT ADAPTER FOR RAIL MOUNTED TERMINAL BLOCK RELAYS

CROSS-REFERENCE TO RELATED APPLICATIONS

This application is a continuation-in-part of U.S. application Ser. No. 10/261,278 filed Sep. 30, 2002 U.S. Pat. No. 6,648,692.

STATEMENT REGARDING FEDERALLY SPONSORED RESEARCH OR DEVELOPMENT

BACKGROUND OF THE INVENTION

The present invention relates to narrow-profile, terminal block relays and in particular to a method of adding electrical fuses or other components to such relays.

"European style" terminal blocks provide a method of electrical interconnection of industrial control components. These terminal blocks have a narrow and flat shape that allows them to be stacked together in close proximity when mounted on a DIN rail. When so stacked, wires may be received at terminals along the upper and lower edge of the terminal blocks.

The terminals allow connection to other wires connected to other terminals or to the leads of electrical components supported by the terminal block. Such electrical components may include fuses, indicator lights, and relays.

For a terminal block holding a relay ("a terminal block relay") or a fuse ("a terminal block fuse"), the relay or fuse is typically received by a socket at the front edge of the terminal block. The housings holding the relay or fuse are designed to have a width no greater than that of the terminal block, typically between 5 to 14 mm, to minimize space occupied on the DIN rail.

Programmable logic controllers (PLCs) are industrial computers used for the control of machines and processes. A PLC has input and output circuits that may connect to sensors and actuators on controlled machines and by executing a standard control language, such as relay ladder language, the PLC may read the inputs and according to the execution of the control program and provide outputs controlling the machine.

Terminal block relays are often used with a PLC, the latter which may be attached to the same DIN mounting rail on which the terminal block relays are mounted. Outputs from the PLC are connected to the coils of terminal block relays whose contacts in turn connect to the desired machine actuator to provide a form of isolation.

When the contacts of a terminal block relay are connected, for example to an inductive load, a fuse may be placed in series with those contacts. This normally entails placing a fuse terminal block adjacent to each terminal block relay doubling the required space needed on the mounting rail. When many outputs to inductive loads are required, the amount of space on the rail is quickly exhausted. A similar problem arises when other components are added to the terminal block relay, including timing circuits or voltage suppressors.

SUMMARY OF THE INVENTION

The present invention provides a component adapter for adding an electrical component to a standard terminal block relay without using additional space on the mounting rail. The component adapter also minimizes the wiring required to add an electrical component to a terminal block relay. Generally, the component adapter has a narrow housing holding an added component within the width of the terminal block relay so as not to interfere with adjacent terminal blocks.

Specifically, the present invention provides an in-plane component adapter for use with a terminal block of a type mountable at a rear surface on a laterally extending rail to present a substantially constant lateral thickness between left and right planar walls that may abut corresponding planar walls of adjacent terminal blocks mounted on the rail. The terminal block may be of a type providing a plurality of terminals accessible at upper and lower edges of the terminal block for receiving electrical conductors communicating electrical signals to a socket of the terminal block, the socket for receiving a relay having relay pins insertable into the socket from a front surface of the terminal block.

The component adapter includes an insulating housing having a width substantially equal to the lateral thickness of the terminal block and at least one electrical component having terminals and contained within the insulating housing. At least one conductive pin having a first end extending from a rear surface of the housing and receivable by the terminal block also has a portion within the housing to selectively attach to terminals of the component, and has a second end receiving a conductor at the front surface of the housing. The housing is adapted to be attached to the terminal block so that the housing lies substantially between planes of the left and right planar walls of the terminal block.

Thus, it is one object of the invention to provide a method of adding an electrical component to a terminal block relay without using additional space along the mounting rail.

It is yet another object of the invention to provide a method of adding an electrical component to a terminal block relay that reduces the number of terminal connections that must be made and eliminates the need for jumpers.

In one embodiment, the conductive pins may collectively have first ends extending from a rear surface of the housing and receivable by the socket and second ends terminating in housing sockets receiving the relay pins of the relay at a front surface of the housing.

It is thus another object of the invention to provide a component adapter that is readily accessible from the front of the terminal block.

It is another object of the invention to provide a terminal adapter that does not interfere with wiring connected to the terminals of the terminal block.

The housing may include stabilizing arms extending outward from the front surface of the housing to flank opposed surfaces of the relay when the relay pins are inserted into the housing socket.

It is thus another object of the invention to provide a component adapter that preserves the stability of the attachment of the relay to the terminal block.

The stabilizing arms may include detents resisting removal of the relay from the housing socket.

Thus, it is another object of the invention to prevent accidental dislodgment of the relay when the component adapter is used.

The component may be a fuse, typically in series with one of the relay contacts, or a voltage spike suppresser connected across the coil of the relay to suppress voltages generated at the coil, or a timer circuit independently controlling actuation of the coil when a coil signal is received.

Thus, it is another object of the invention to provide a general purpose housing for attaching ancillary components to a terminal block without decreasing the rail space available for other terminal blocks.

The component adapter may include a door allowing access to the contained component and the door may open on a left or right side of the housing.

Thus, it is another object of the invention to provide a means for replacing or having access to the component without detaching the terminal block from the rail. The side opening door may be accessed by removing the component adapter if necessary.

The lateral thickness of the housing may be less than 7.0 mm.

Thus, it is another object of the invention to provide a system that works with standard European-type terminal blocks.

These particular objects and advantages may apply to only some embodiments falling within the claims and thus do not define the scope of the invention.

BRIEF DESCRIPTION OF THE DRAWINGS

FIG. 3 is a perspective view of the component adapter of FIG. 2 showing the orientation of the fuse in phantom and the opening of a door for replacing the fuse without mechanical disconnection of an external wire;

FIG. 4 is a fragmentary, side elevational view of the terminal block relay of FIG. 1 (inverted with respect to FIG. 1) with the component adapter attached to terminal of the terminal block relay and showing the abutment of two surfaces of the component adapter to resist torsion and further showing the use of a key received in a keyway of the component adapter to provide increased mechanical stability and showing the forward facing screw terminal and indicator lamp;

DETAILED DESCRIPTION OF THE PREFERRED EMBODIMENT

Figure 1:
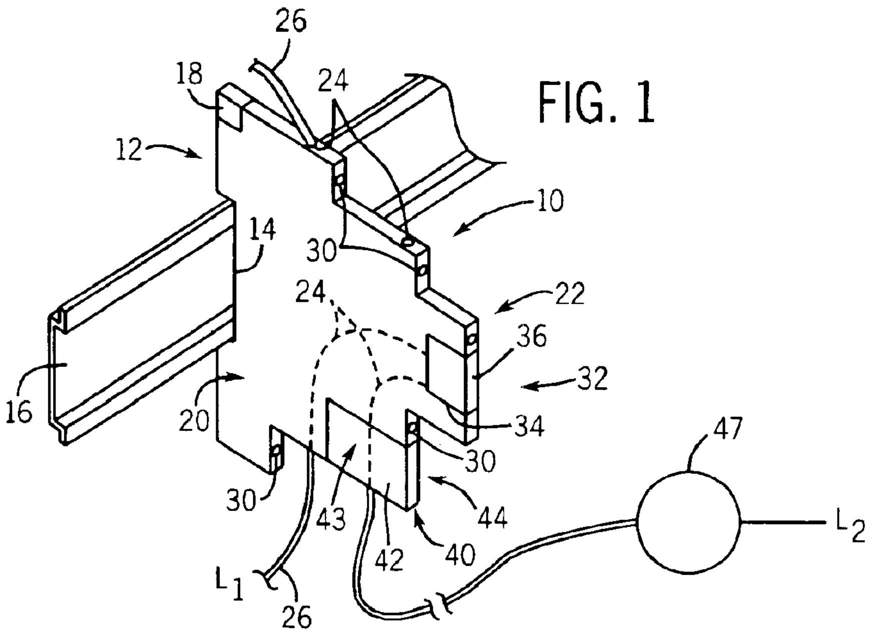
FIG. 1 is a perspective view of a standard terminal block relay mounted at its rear on a DIN rail (inverted from normal mounting to show the latching mechanism) with the component adapter of the present invention attached at a lower edge.

Referring now to FIG. 1, a standard terminal block relay 10 may include a rear surface 12 having a channel 14 for receiving a DIN rail 16. Left side 20 and right sides 22 of the terminal block relay 10 are substantially planar so as to abut corresponding left or right sides of other similar terminal blocks that may also be placed on the DIN rail 16 and stacked together against the terminal block relay 10 with no wasted space. The terminal block relay 10 may be releasably retained on the DIN rail 16 by operation of a catch (not shown) retractable by a slide 18.

The upper and lower edges of the terminal block relay 10 support terminals 24, such as screw terminals, for receiving and electrically connecting to wires 26, free from interference from adjacent terminal blocks.

The front edge 32 of the terminal block relay 10 includes a socket 34 holding a narrow profile electrical relay 36 whose left and right sides are coplanar with left side 20 and right side 22 of the terminal block relay 10, and whose front edge is flush with the front edge 32 of the terminal block relay 10, the relay 36 may be removed from the terminal block relay 10 for repair or to change the relay type as may be desired.

As is understood in the art, contacts and coil of the relay 36 are connected through the socket 34 to the various ones of the terminals 24 via conductors internal to the terminal block relay 10. The terminal block relay 10 thus provides a simple method of connecting to the relay 36 mechanically and electrically.

Terminal block relays 10 of this kind may be commercially purchased from a variety of vendors including the Allen-Bradley brand from Rockwell Automation of Milwaukee, Wis.

According to the present invention, a fuse adapter 40 may be attached at one of the terminals 24 of the terminal block relay 10. Generally, the fuse adapter 40 allows a fuse or other component to be incorporated into the circuit of the relay 36 of the terminal block relay 10 so that a first external wire 26 from a line source $L_1$ (possibly connected through shutoff switches and the like), may connect to one side of the terminal block relay 10 and, via internal conductors, to a contact of the relay 36. A return from the contact of the relay 36 may pass through other internal conductors to a terminal 24 of the terminal block relay 10 and then through the fuse adapter 40 containing a fuse (not shown). From the fuse adapter 40, the conductive path may proceed to an inductive load 47 to return to the remaining side of the line $L_2$.

Figure 2:
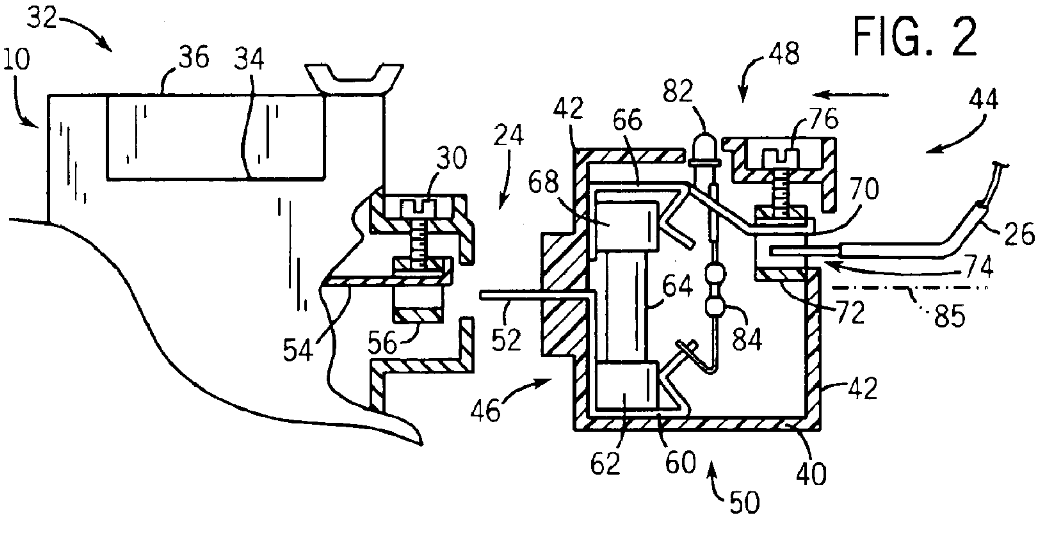
FIG. 2 is an exploded view of the component adapter and terminal block relay of FIG. 1 rotated by 90 degrees and in partial cross-section showing a conductive extension of the component adapter received by a screw terminal of the terminal block relay to provide mechanical and electrical connection to the terminal block relay, and showing a screw terminal, internal fuse, and indicator lamp of the component adapter.

Referring now to FIGS. 1 and 2, the fuse adapter 40 may have a generally block-shaped outer housing 42 molded of an electrically nonconductive plastic. The housing 42 provides left and right sides 43 and 44 that are coplanar with left side 20 and right side 22 of the terminal block relay 10 when the fuse adapter 40 is attached to the terminal block relay 10.

Joining the left and right sides 43 and 44 of the housing 42 are opposed terminal wall 44 and conductive extension wall 46, and opposed front and rear walls 48 and 50, respectively, each named according to the orientation of the fuse adapter 40 when it is engaged with the terminal block relay 10.

Passing out of the extension wall 46 is a conductive extension 52 that may be received by terminal 24 of the terminal block relay 10. Specifically, the conductive extension 52 fits into a stirrup 56 of the terminal 24 and is pulled against an internal conductor 54 by one wall of the stirrup 56 which compresses the extension 52 against the internal conductor 54 driven by action of a captive screw 30. Such screw terminals 24 are well known in the art.

The conductive extension 52 as held by the extension wall 46 also extends into the housing 42 of the fuse adapter 40 to connect to a first socket 60 positioned near the rear wall 50. Socket 60 provides a spring clamp sized to receive one end cap 62 of a standard electrical fuse 64. Positioned within the opposite side of the housing 42 near front wall 48 of the housing is a second socket 66 for receiving the second end cap 68 of the fuse 64. The fuse 64 is thus held along an axis extending generally from the front to the back of the terminal block relay 10 when the fuse adapter 40 is installed.

The socket 66 connects to internal conductor 70 which is received within a stirrup 72 of a terminal 74 similar to terminal 24. A screw 76, accessible through the front wall 48 of the housing 42, may tighten the stirrup 72 to compress the internal conductor 70 into electrical contact with an external wire 26 inserted into the stirrup 72. Alternatively, a screw-less type clamp, well known in the art, may be used.

A front facing indicator lamp 82, preferably a light emitting diode (LED) or neon lamp, is connected in parallel across sockets 66 and 60 with one lead of the lamp 82 connecting through resistor 84 to socket 60 and a second lead connecting directly to socket 66. When the fuse 64 is absent or open, the application of a voltage across the extension 52 and terminal 74 will cause the lamp 82 to light indicating the fuse 64 needs to be replaced. Such a circuit is adequate for low voltage AC and DC applications and may be modified as is understood in the art for higher voltage applications or polarity sensitive applications.

In the preferred embodiment, an insertion direction 85 along which the external wire 26 is inserted into the terminal 74 will be the same as the insertion direction along which the extension 52 is inserted into the terminal 24. In addition, the screw 76 is accessible by a screwdriver 90 in the same direction as the screws 30 of the other terminals (as shown in FIGS. 2 and 4). In this way, the orientation of external wiring is not significantly altered when the fuse adapter 40 is added.

Referring now to FIG. 3, the housing 42 may include a door 86 that may hinge to an open position (shown in phantom) to allow access to the fuse 64 for replacement. The door may be hinged by means of a living hinge formed in the plastic of the housing 42. As will be understood, the orientation of the fuse 64 allows the height of the fuse adapter 40 measured away from the terminal block relay 10 to be minimized reducing torque on the extension 52. The surface of the extension 52 such as engages the stirrup 56 and/or the internal conductor 54 of terminal 24 of the terminal block relay 10 may include a series of sharpened ridges 53 or embossment to present slippage between these surfaces.

Referring now to FIG. 4, preferably, the wire 26 is attached to the fuse adapter 40 before the fuse adapter 40 is attached to the terminal block relay 10. In this way, any twisting by screwdriver 90 on the housing 42 is not transmitted to the connection between the fuse adapter 40 and the terminal block relay 10.

Twisting of the fuse adapter 40 caused by the external wire 26 may be absorbed by the abutment of surfaces of the housing 42 of the fuse adapter 40 and the housing of the terminal block relay 10. Preferably, at least two perpendicular surfaces, for example, the conductive extension wall 46 and the rear wall 50 of the fuse adapter 40 may abut corresponding surfaces on the terminal block relay 10. The extension 52 holds these surfaces tightly against the terminal block relay 10 allowing these abutting surfaces to convert torque to the housing 42 to tension on the conductive extension 52 which is more readily accommodated by the terminal 24.

The housing 42 of the fuse adapter 40 may further include a key section 92 interfitting within a keyway 94 such as may be intentionally added to the terminal block relay 10 or may be fortuitously existing for other purposes, in this case, for a jumper connector channel. The housing 42 may also include a post on the rear surface interfitting with the opening of the terminal block relay screw terminal below.

Figure 5:
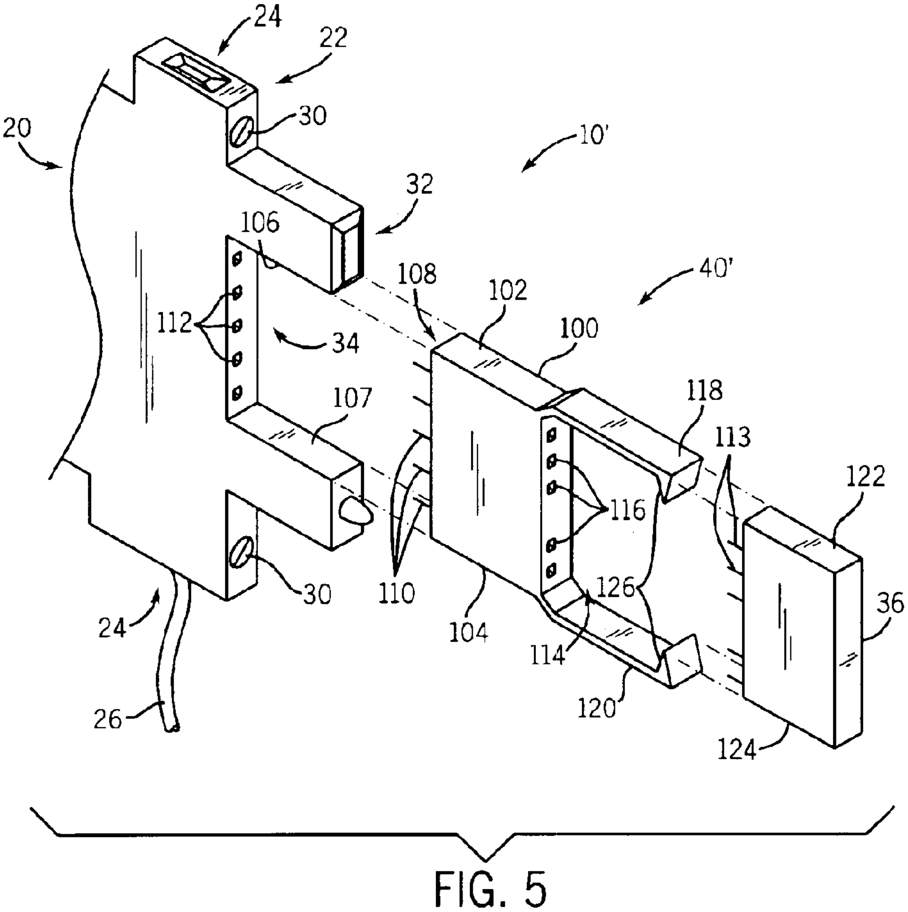
FIG. 5 is an exploded perspective view of an alternative embodiment of the invention in which the component adapter fits between the relay and a terminal block socket.

Referring now to FIG. 5, in an alternative embodiment, a fuse adapter 40' may be placed between the socket 34 of the terminal block 10' and the relay 36, thereby avoiding interference with wires 26 attached to terminals 24 or the obstruction of one or more terminals 24.

In this embodiment, the fuse adapter 40' uses an insulating, rectangular parallelepiped housing 100 similar to housing 42 described above, but sized to fit within the socket 34 with upper and lower surfaces 102 and 104 of the housing 100 sliding along upper inner edge 106 and lower inner edge 107 of the socket 34. A rear surface 108 of the housing 100 supports a number of conductive pins 110 which may be received by corresponding conductive receptacles 112 in the front facing wall of the socket 34. These conductive pins 110 are arranged and sized to be substantially identical to relay pins 113 extending from a rear surface of the relay 36.

A front surface 114 of the housing 100 provides conductive receptacle 116 arranged and sized to be substantially identical to conductive receptacles 112 to receive the relay pins 113 of the relay 36.

The housing 100 also includes upper and lower forward extending arms 118 and 120 having inner surfaces aligned with and parallel to upper surface 102 and lower surface 104 of the relay 36 so as to receive upper edge 122 and lower edge 124 of the relay 36 therebetween. The arms 118 and 120 thus jog outward so as to provide for a component adapter 40' that may fill the space in the socket 34 previously occupied by the relay 36 and yet hold the same relay 36 that would have occupied that space.

Frontward edges of the arms 118 and 114 include inwardly facing teeth 126 that serve to retain the relay 36 in engagement with the housing 100 absent a flexing of the arms 118 and 120 outward that may be used to release the relay 36. The arms 118 and 120 thus provide support and stability for the relay 36 and allow the housing 100 to be removed from the terminal block 10' by grasping the arms 118 and 120 against the relay 36 and applying a forward-pulling force.

The interfitting of the surfaces 102 and 104 against the socket inner edges 106 and 107 resist twisting of the housing 100 such as may damage the conductive pins 110. Similarly, the interfitting of the inner surfaces of the upper and lower forward extending arms 118 and 120 against the upper edge 122 and lower edge 124 of the relay 36 resist twisting of the relay 36 such as may damage the relay pins 113 or receptacles 116.

Figure 6:
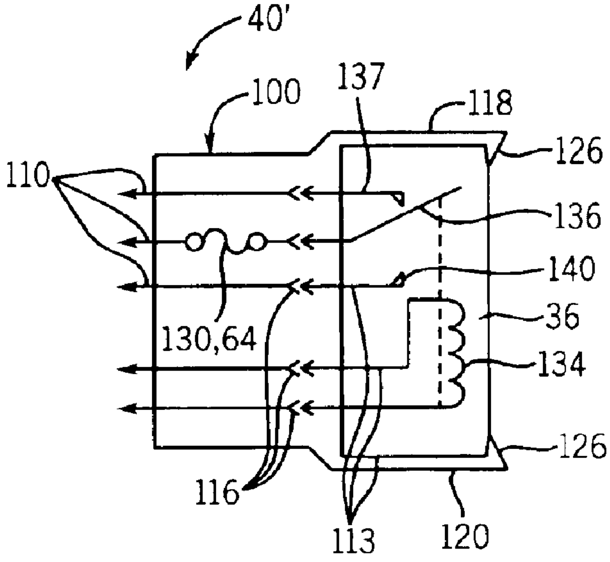
FIG. 6 is a schematic diagram of the electrical connection of the relay to the component adapter of FIG. 5 showing placement of a fuse in line with a movable contact of the relay.

Referring now to FIG. 6, generally the conductive pins 110 of the fuse adapter 40' extend into the interior of the housing 100 where they may be attached to a component 130, in this case, a fuse 64 placed in series with one of the conductive pins 110. Remaining ends of the conductive pins 110 present the conductive receptacles 116 accessible from a front edge of the housing 100 that receive the relay pins 113.

Two of the relay pins 113 provide connections to an internal electromagnetic coil 134 which may pull a movable contact 136 of the relay 36 toward a normally closed contact 140 and away from a normally open contact 137. Each of these contacts 140 and 137 is also connected to one of the conductive pins 110 through corresponding conductive receptacles 116. The fuse 64 may be placed in series with the conductive pin 110 connected to the movable contact to provide fusible protection for a variety of different connections of those contacts to devices. Note the present invention is also applicable to relay and opto-isolator driven relays 36 where the fuse may be placed in series with solid-state switching elements.

Figure 7:
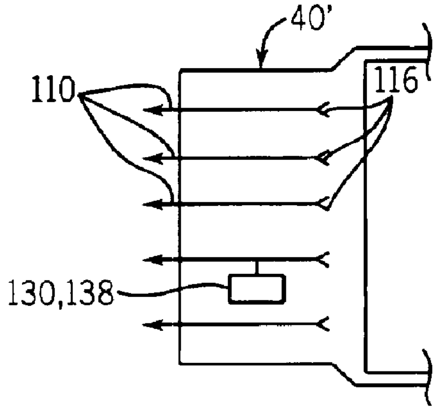
FIG. 7 is a figure similar to that of FIG. 6 showing an alternative embodiment of the component adapter where the component is a voltage surge suppressor across the relay coil conductors.

Referring to FIG. 7, in an alternative embodiment, the component 130 may be a voltage surge suppressor 138 placed across the conductive pins 110 which would connect to the coil 134 shown in FIG. 6. Such voltage suppression circuitry may, for example, be a fly-back diode positioned against the normal energizing polarity of the conductive pins 110, back-to-back diodes having a high breakdown voltage including but not limited to zener diodes, and metal oxide varistors (MOVs), or a snubbing network composed of resistors, capacitors, and/or inductors as is understood in the art. Generally, such voltage suppression circuitry minimizes transient voltage generated at the relay coil from being communicated to other adjacent circuitry. Similar circuitry can be placed across the conductive pins 110 communicating with the contacts 136, 140 and 137, particularly when those contacts will drive noisy or inductive loads and may serve to prevent damage to the relay 36.

Figure 8:
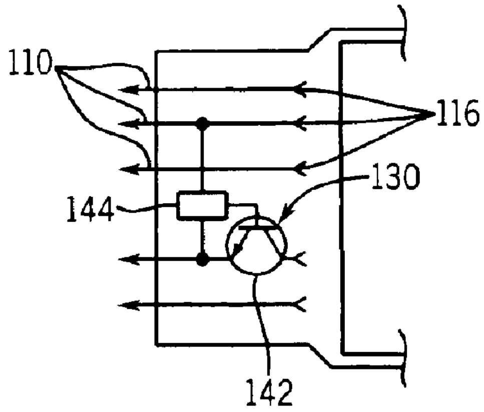
FIG. 8 is a figure similar to that of FIGS. 6 and 7 showing an alternative embodiment of the component adapter where the component is timer circuitry within the component adapter.

Referring now to FIG. 8, in an alternative embodiment, the component 130 may include a switching device 142 placed in series with one of the conductive pins 110 leading to the coil 134 so as to control current flow there-through, in this example, to interrupt the current flow prior to cessation of voltage placed on the conductive pins 110 leading to the relay coil 134. Timer circuitry 144, for example, using resistive and capacitive elements, may communicate with the switching device 142 to provide a time delay in that switching. The timer circuitry 144 may receive power and ground from one of the other conductive pins 110 as will be understood in the art.

Generally, the embodiment of FIGS. 1–4 may also be used with components 130 other than fuses 64. As used herein, the conductive pin refers generally to any electrically continuous conductor and does not require a particular gauge of conductor, a single integral conductor, or other specific mechanical properties.

It is specifically intended that the present invention not be limited to the embodiments and illustrations contained herein, but include modified forms of those embodiments including portions of the embodiments and combinations of elements of different embodiments as come within the scope of the following claims.

We claim:

1. An in-plane component adapter used with a terminal block of a type mountable at a rear surface on a laterally extending rail to present a substantially constant lateral thickness between left and right planar walls that may abut corresponding planar walls of adjacent terminal blocks mounted on the rail, the terminal block providing a plurality of terminals accessible at upper and lower edges of the terminal block for receiving electrical conductors communicating electrical signals to a socket of the terminal block, the socket for receiving a relay having relay pins insertable into the socket from a front surface of the terminal block, the component adapter comprising:

an insulating housing having a width substantially equal to the lateral thickness of the terminal block;

at least one component within the insulating housing having terminals;

at least one conductive pin having a first end extending from a rear surface of the housing and receivable by the terminal block, having a portion within the housing to selectively attach to the terminals of the at least one component, and having a second end receiving a conductor from the relay at a front surface of the housing; and wherein the housing may be attached to the terminal block so that the housing lies substantially between planes of the left and right planar walls of the terminal block and wherein the housing includes upper and lower forward extending stabilizing means having inner surfaces aligned with and parallel to upper surface and lower surface of the relay so as to receive upper edge and lower edge of the relay therebetween when the conductor from the relay is received by the second end.

2. The in-plane component adapter of claim 1 wherein the housing is sized to engage portions of the terminal block assembly to stabilize the housing against twisting.

3. The in-plane component adapter of claim 1 wherein the housing includes a door allowing access to the at least one component.

4. The in-plane component adapter of claim 1 wherein the at least one component is a fuse having two terminals joined by a fusible link.

5. The in-plane component adapter of claim 4 wherein the housing includes a socket releasably holding the terminals of the fuse.

6. The in-plane component adapter of claim 1 wherein the at least one component is a voltage spike suppressor selected from the group consisting of flyback diodes, zener diodes, MOV devices, capacitors, inductors, and resistors.

7. The in-plane component adapter of claim 1 wherein the at least one component is a timer circuit.

8. The in-plane component adapter of claim 1 wherein the stabilizing means include detents resisting the removal of the relay from the housing socket.

9. The in-plane component adapter of claim 1 wherein the housing include upper and lower surfaces that abut corresponding surfaces of the terminal block to resist torsion of the fuse adapter with respect to the terminal block when the housing is inserted into the terminal block socket.

10. The in-plane component adapter of claim 1 wherein the electrical component is a fuse.

11. The in-plane component adapter of claim 10 wherein the housing includes a fuse socket for releasably attaching selected conductive pins to the fuse.

12. The in-plane component adapter of claim 11 wherein the housing includes an opening providing access to the fuse socket.

13. An in-plane component adapter used with a terminal block of a type mountable at a rear surface on a laterally extending rail to present a substantially constant lateral thickness between left and right planar walls that may abut corresponding planar walls of adjacent terminal blocks mounted on the rail, the terminal block further providing a plurality of terminals accessible at upper and lower edges of the terminal block for receiving electrical conductors communicating electrical signals to a relay of the terminal block, and providing a terminal block socket for receiving the relay having relay pins insertable into the terminal block socket from a front surface, the component adapter comprising:

an insulating housing;

a component within the insulating housing having terminals;

conductive pins collectively having: first ends extending from a rear surface of the housing and receivable by the socket, portions within the housing attached to terminals of the component, and second ends terminating in housing receptacles receiving the relay pins of the relay at a front surface of the housing;

wherein when the conductive pins are received by the terminal block socket, the housing lies substantially between planes of the left and right planar walls of the terminal block; and wherein the housing includes upper and lower forward extending stabilizing means having inner surfaces aligned with and parallel to upper surface and lower surface of the relay so as to receive upper edge and lower edge of the relay therebetween when the relay pins are inserted into the housing receptacles.

14. The in-plane component adapter of claim 13 wherein the component is a voltage spike suppressor connected across pins communicating a coil of the relay when the relay pins are received by the housing receptacles.

15. The in-plane component adapter of claim 13 wherein the component is a timer circuit independently controlling a time of actuation of a coil of a relay communicating with the conductive pins of the housing.

16. The in-plane component adapter of claim 13 wherein the housing has a substantially constant lateral thickness of substantially from 5 to 8 mm.

17. A terminal block relay assembly comprising:

a terminal block housing having a rear surface including a channel allowing the housing to be mounted on a laterally extending rail to present a substantially constant lateral thickness between left and right planar walls that may abut corresponding planar walls of adjacent terminal blocks mounted on the rail;

a plurality of terminals accessible at upper and lower edges of the terminal block housing for receiving electrical conductors communicating electrical signals to a relay held by the terminal block housing;

an in-plane fuse adapter including:

(a) an insulating adapter housing having a width substantially equal to the lateral thickness of the terminal block housing;

(b) at least one component within the adapter housing having terminals;

(c) at least one conductive pin having a first end extending from a rear surface of the adapter housing and receivable by the terminal block housing, having a portion within the adapter housing to selectively attach to terminals of the component and having a second end receiving a conductor from the relay at a front surface of the adapter housing;

wherein the adapter housing may be attached to the terminal block housing so that the adapter housing ties substantially between planes of the left and right planar walls of the terminal block housing; and wherein the housing includes upper and lower forward extending stabilizing means having inner surfaces aligned with and parallel to upper surface and lower surface of the relay so as to receive upper edge and lower edge of the relay therebetween when the conductor from the relay is received by the second end.

18. The terminal block relay assembly of claim 17 wherein the adapter housing is sized to engage portions of the terminal block housing assembly to stabilize the adapter housing against twisting.

19. The terminal block relay assembly of claim 17 wherein the adapter housing includes a door allowing access to the at least one component.

20. The terminal block relay assembly of claim 17 wherein the at least one component is a fuse having two terminals joined by a fusible link.

21. The terminal block relay assembly of claim 20 wherein the adapter housing includes a socket releasably holding the terminals of the fuse.

22. The terminal block relay assembly of claim 17 wherein the at least one component is a voltage spike suppressor selected from the group consisting of flyback diodes, zener diodes, MOV devices, capacitors, inductors, and resistors.

23. The terminal block relay assembly of claim 17 wherein the at least one component is a timer circuit.

24. A terminal block relay assembly comprising:

a terminal block housing having a rear surface including a channel allowing the housing to be mounted on a laterally extending rail to present a substantially constant lateral thickness between left and right planar walls that may abut corresponding planar walls of adjacent terminal blocks mounted on the rail;

a plurality of terminals accessible at upper and lower edges of the terminal block housing for receiving electrical conductors communicating electrical signals to a relay held by the terminal block housing;

a terminal block socket for receiving a relay having relay pins insertable into the terminal block socket from a front surface of the terminal block housing;

an in-plane fuse adapter including:

(a) an insulating adapter housing;

(b) a component within the adapter housing having terminals;

(c) conductive pins collectively having: first ends extending from a rear surface of the adapter housing and receivable by the terminal block socket, portions within the adapter housing attached to terminals of the component, and housing receptacles receiving the relay pins of a relay at a front surface of the housing; and wherein when the conductive pins are received by the terminal block socket, the housing lies substantially between planes of the left and right planar walls of the terminal block housing; and wherein the housing includes upper and lower forward extending stabilizing means having inner surfaces aligned with and parallel to upper surface and lower surface of the relay so as to receive upper edge and lower edge of the relay therebetween when the relay pins are inserted into the housing receptacles.

25. The terminal block relay assembly of claim 24 wherein the stabilizing means are stabilizing arms extending outward from the front surface of the adapter housing to flank opposed surfaces of the relay when the relay pins are inserted into the housing socket.

26. The terminal block relay assembly of claim 25 wherein the stabilizing arms include detents resisting the removal of the relay from the housing socket.

27. The terminal block relay assembly of claim 24 wherein the adapter housing include upper and lower surfaces that abut corresponding surfaces of the terminal block housing to resist torsion of the fuse adapter with respect to the terminal block housing when the adapter housing is inserted into the terminal block housing.

28. The terminal block relay assembly of claim 24 wherein the electrical component is a fuse.

29. The terminal block relay assembly of claim 28 wherein the adapter housing includes a fuse socket for releasably attaching selected conductive pins to the fuse.

30. The terminal block relay assembly of claim 29 wherein the adapter housing includes an opening providing access to the fuse socket.

31. The terminal block relay assembly of claim 24 wherein the component is a voltage spike suppressor connected across pins communicating a coil of the relay when the relay pins are received by the housing receptacles.

32. The terminal block relay assembly of claim 24 wherein the component is a timer circuit independently controlling a time of actuation of a coil of a relay communicating with the conductive pins of the adapter housing.

33. The terminal block relay assembly of claim 24 wherein the adapter housing has a substantially constant lateral thickness of substantially from 5 to 8 mm.

* * * * *